United States Patent
Namikawa et al.

(10) Patent No.: US 12,441,396 B2
(45) Date of Patent: Oct. 14, 2025

(54) STEERING CONTROL DEVICE

(71) Applicants: JTEKT CORPORATION, Kariya (JP); TOYOTA JIDOSHA KABUSHIKI KAISHA, Toyota (JP)

(72) Inventors: Isao Namikawa, Okazaki (JP); Satoshi Matsuda, Okazaki (JP); Tomoyuki Iida, Nisshin (JP); Masaharu Yamashita, Toyota (JP); Kenji Shibata, Nagoya (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 780 days.

(21) Appl. No.: 17/546,110

(22) Filed: Dec. 9, 2021

(65) Prior Publication Data
US 2022/0185367 A1     Jun. 16, 2022

(30) Foreign Application Priority Data
Dec. 14, 2020 (JP) ................. 2020-207050

(51) Int. Cl.
| | | |
|---|---|---|
| B62K 25/30 | (2006.01) | |
| B62D 5/00 | (2006.01) | |
| B62D 5/04 | (2006.01) | |
| B62D 6/00 | (2006.01) | |
| B62K 3/02 | (2006.01) | |
| B62K 25/04 | (2006.01) | |

(52) U.S. Cl.
CPC ............... B62D 6/00 (2013.01); B62D 5/006 (2013.01); B62D 5/0463 (2013.01)

(58) Field of Classification Search
CPC .......... B62D 6/008; B62D 6/00; B62D 5/046; B62D 5/006; B62D 5/0463; B62D 6/003; B62D 5/0487; B62D 7/14
USPC ............................................. 180/446; 701/41
See application file for complete search history.

(56) References Cited

U.S. PATENT DOCUMENTS 5,774,819 A * 6/1998 Yamamoto ............. B62D 6/008
                                                           701/41
6,213,248 B1    4/2001 Kawaguchi et al.
(Continued)

FOREIGN PATENT DOCUMENTS

| | | |
|---|---|---|
| CN | 111661143 A | 9/2020 |
| EP | 2 944 543 A1 | 11/2015 |

(Continued)

OTHER PUBLICATIONS

May 13, 2022 Extended Search Report issued in European Patent Application No. 21213342.5.
(Continued)

*Primary Examiner* — Valentin Neacsu
*Assistant Examiner* — Nabin Kumar Sharma
(74) *Attorney, Agent, or Firm* — Oliff PLC

(57) ABSTRACT

A steering control device includes a first calculator configured to calculate a first axial force, a second calculator, and a third calculator configured to calculate a third axial force. The third calculator is configured to, when a specific situation occurs in which a current of a turning motor has to be limited, decrease a reflection degree of the first axial force in the third axial force and increase a reflection degree of the second axial force in the third axial force.

5 Claims, 4 Drawing Sheets

(56) References Cited

U.S. PATENT DOCUMENTS

| | | | |
|---|---|---|---|
| 2004/0211618 A1* | 10/2004 | Ogawa | B62D 5/046 |
| | | | 180/402 |
| 2014/0238769 A1* | 8/2014 | Tamaizumi | B62D 6/04 |
| | | | 180/446 |
| 2017/0267276 A1 | 9/2017 | Kodera et al. | |
| 2019/0233001 A1* | 8/2019 | Namikawa | B62D 5/001 |
| 2019/0291777 A1* | 9/2019 | Ishio | B62D 5/0463 |
| 2020/0130739 A1* | 4/2020 | Kodera | B62D 6/008 |
| | | | 701/41 |
| 2020/0164916 A1 | 5/2020 | Shibata et al. | |
| 2020/0283059 A1* | 9/2020 | Kodera | B62D 6/008 |
| 2020/0298908 A1 | 9/2020 | Namikawa et al. | |
| 2020/0307686 A1 | 10/2020 | Namikawa et al. | |

FOREIGN PATENT DOCUMENTS

| | | | | |
|---|---|---|---|---|
| EP | 3 715 216 A1 | | 9/2020 | |
| JP | H10-217998 A | | 8/1998 | |
| JP | 2004058829 | * | 2/2004 | B62D 12/02 |
| JP | 2004-322715 A | | 11/2004 | |
| JP | 2010042759 | * | 2/2010 | B62D 137/00 |
| JP | 2017-165219 A | | 9/2017 | |
| JP | 2019-209944 A | | 12/2019 | |
| JP | 2020-069860 A | | 5/2020 | |
| JP | 2020-083059 A | | 6/2020 | |
| JP | 2020-142596 A | | 9/2020 | |
| JP | 2020-152174 A | | 9/2020 | |
| JP | 2020-158070 A | | 10/2020 | |

OTHER PUBLICATIONS

Dec. 19, 2023 Office Action issued in Japanese Patent Application No. 2020-207050.

Apr. 22, 2025 Office Action issued in Chinese Patent Application No. 202111492657.0.

* cited by examiner

STEERING CONTROL DEVICE

CROSS-REFERENCE TO RELATED APPLICATION

This application claims priority to Japanese Patent Application No. 2020-207050 filed on Dec. 14, 2020, incorporated herein by reference in its entirety.

BACKGROUND

1. Technical Field

The invention relates to a steering control device.

2. Description of Related Art

A so-called steer-by-wire type steering device is known that separates power transmission between a steering wheel and turning wheels. The steering device has a reaction force motor that is a source of a steering reaction force applied to a steering shaft, and a turning motor that is a source of a turning force that turns the turning wheels. When the vehicle is traveling, a control device of the steering device generates a steering reaction force through the reaction force motor and turns the turning wheels through the turning motor.

In the steer-by-wire type steering device, the power transmission between the steering wheel and the turning wheel is separated, and thus, it is difficult for a road surface reaction force acting on the turning wheels to be transmitted to the steering wheel. Therefore, a driver is less likely to feel the road surface condition through the steering wheel as a response.

Therefore, for example, a control device described in Japanese Unexamined Patent Application Publication No. 2017-165219 (JP 2017-165219 A) calculates an ideal axial force, which is an ideal rack axial force based on a target turning angle, and a road surface axial force, which is an estimated value of rack axial force based on a current value of the turning motor. The control device adds up the ideal axial force and the road surface axial force at a predetermined distribution ratio, and controls the reaction force motor by using a base reaction force based on the added axial force. Since the road surface condition is reflected in the road surface axial force, the road surface condition is also reflected in the steering reaction force generated by the reaction force motor. Therefore, the driver can feel the road surface condition as the steering reaction force.

SUMMARY

The general steer-by-wire type steering device in the related art, including the steering device of JP 2017-165219 A, is provided with various protection functions depending on product specifications. An example of the protection function includes an overheat protection function of the turning motor. The control device having the function monitors the temperature of the turning motor, for example, and limits the amount of current supplied to the turning motor when the monitored temperature approaches an overheating state. This makes it possible to protect the turning motor.

However, when a control device that reflects the road surface axial force in the steering reaction force, as in JP 2017-165219 A, is provided with the overheat protection function for the turning motor, the following limitations are likely to arise. That is, the road surface axial force is calculated by multiplying the current value of the turning motor by a predetermined coefficient. For this reason, when the amount of current of the turning motor is limited from the standpoint of overheat protection of the turning motor, the road surface axial force and, by extension, the steering reaction force may decrease with the limited amount of current. Therefore, for example, despite that fact that the steering reaction force has to be further increased as information for the driver, a limitation is likely to arise that the originally demanded steering reaction force cannot be secured by executing the overheat protection function of the turning motor.

The invention provides a steering control device capable of securing a steering reaction force as information for a driver even when the current of the turning motor is limited.

The invention relates to a steering control device. The steering control device controls a reaction force motor based on a command value calculated according to a steering condition. The reaction force motor is a source of a steering reaction force applied to a steering wheel that is separated in power transmission from a turning shaft. The steering control device includes a first calculator configured to calculate a first axial force acting on the turning shaft based on a current value of a turning motor that is a source of a turning force applied to the turning shaft, a second calculator configured to calculate a second axial force acting on the turning shaft based on another vehicle state variable different from the current value of the turning motor, and a third calculator configured to calculate a third axial force that is a final axial force to be reflected in the command value based on the first axial force and the second axial force. The third calculator is configured to, when a specific situation occurs in which a current of the turning motor has to be limited, decrease a reflection degree of the first axial force in the third axial force and increase a reflection degree of the second axial force in the third axial force.

When the current of the turning motor is limited, the first axial force calculated based on the current value of the turning motor, and, by extension, the third axial force on which the first axial force is reflected may also be limited. Accordingly, a limitation is likely to arise that the originally demanded steering reaction force cannot be secured. In this regard, with the aforementioned configuration, when a specific situation occurs in which the current of the turning motor has to be limited, the reflection degree of the first axial force in the third axial force decreases, while the reflection degree of the second axial force in the third axial force increases. That is, in the third axial force, the second axial force is more dominant. The second axial force is not easily affected by the current limit of the turning motor. Therefore, it is possible to secure the steering reaction force as information for a driver even when the current of the turning motor is limited.

In the steering control device, the third calculator may be configured to calculate the third axial force by adding up values obtained by multiplying the first axial force and the second axial force by distribution ratios. The distribution ratios may be set individually according to a vehicle behavior, a steering condition, or a road surface condition. The third calculator may be configured to, when the specific situation occurs in which the current of the turning motor has to be limited, decrease the distribution ratio of the first axial force to the third axial force and increase the distribution ratio of the second axial force to the third axial force.

With the aforementioned configuration, when the specific situation occurs in which the current of the turning motor has to be limited, it is possible to decrease the reflection degree of the first axial force in the third axial force by decreasing the distribution ratio of the first axial force to the third axial force. Further, when the specific situation occurs in which the current of the turning motor has to be limited, it is possible to increase the reflection degree of the second axial force in the third axial force by increasing the distribution ratio of the second axial force to the third axial force. Further, it is possible to switch between the first axial force and the second axial force step by step by increasing or decreasing the distribution ratio of the first axial force and the distribution ratio of the second axial force. Therefore, for example, it is possible to secure, step by step, the steering reaction force as information for the driver with the degree of the specific situation in which the current of the turning motor has to be limited.

The steering control device may further include a fourth calculator configured to, when the specific situation occurs in which the current of the turning motor has to be limited, individually calculate the distribution ratios for use at a time of current limit for the first axial force and the second axial force, based on a predetermined standpoint. The predetermined standpoint may be a standpoint where the distribution ratio of the first axial force to the third axial force is further decreased, while the distribution ratio of the second axial force to the third axial force is further increased. The third calculator may be configured to, when the specific situation occurs in which the current of the turning motor has to be limited, calculate the third axial force by using the distribution ratios for use at the time of current limit which are calculated by the fourth calculator.

With the aforementioned configuration, when the specific situation occurs in which the current of the turning motor has to be limited, the distribution ratio of the first axial force to the third axial force can be further decreased, while the distribution ratio of the second axial force to the third axial force can be further increased, by calculating the third axial force by using the distribution ratios for use at the time of current limit which are calculated by the fourth calculator.

In the steering control device, the fourth calculator may be configured to, when the specific situation occurs in which the current of the turning motor has to be limited, set the distribution ratio of the first axial force to the third axial force to 0% and set the distribution ratio of the second axial force to the third axial force to 100%.

With the aforementioned configuration, when the specific situation occurs in which the current of the turning motor has to be limited, the first axial force calculated based on the current value of the turning motor is not used, and the second axial force calculated based on vehicle state variables other than the current value of the turning motor is calculated as the third axial force. Therefore, it is possible to more appropriately secure the steering reaction force as information for a driver even when the current of the turning motor is limited.

In the steering control device, the third calculator may be configured to, when the specific situation does not occur in which the current of the turning motor has to be limited, calculate the first axial force as it is as the third axial force, and when the specific situation occurs in which the current of the turning motor has to be limited, calculate the second axial force as it is as the third axial force.

With the aforementioned configuration, when the specific situation occurs in which the current of the turning motor has to be limited, the first axial force calculated based on the current value of the turning motor is not used, and the second axial force calculated based on vehicle state variables other than the current value of the turning motor is calculated as the third axial force. Therefore, it is possible to secure the steering reaction force as information for a driver even when the current of the turning motor is limited.

The steering control device may further include a turning controller configured to control the turning motor according to the steering condition. The turning controller may be configured to set a flag value indicating whether or not the specific situation occurs in which the current of the turning motor has to be limited based on whether or not a predetermined determination condition is satisfied. The third calculator may be configured to recognize that the specific situation occurs in which the current of the turning motor has to be limited based on the flag value set by the turning controller.

With the aforementioned configuration, there is no need for the third calculator to determine whether or not the specific situation occurs in which the current of the turning motor has been limited based on whether or not the predetermined determination condition is satisfied. Therefore, it is possible to reduce calculation load of the third calculator.

With the steering control device of the invention, it is possible to secure the steering reaction force as information for a driver even when the current of the turning motor is limited.

BRIEF DESCRIPTION OF THE DRAWINGS

Features, advantages, and technical and industrial significance of exemplary embodiments of the invention will be described below with reference to the accompanying drawings, in which like signs denote like elements, and wherein.

DETAILED DESCRIPTION OF EMBODIMENTS

First Embodiment

Hereinafter, a first embodiment in which a steering control device is embodied as a steer-by-wire type steering device will be described.

Figure 1:
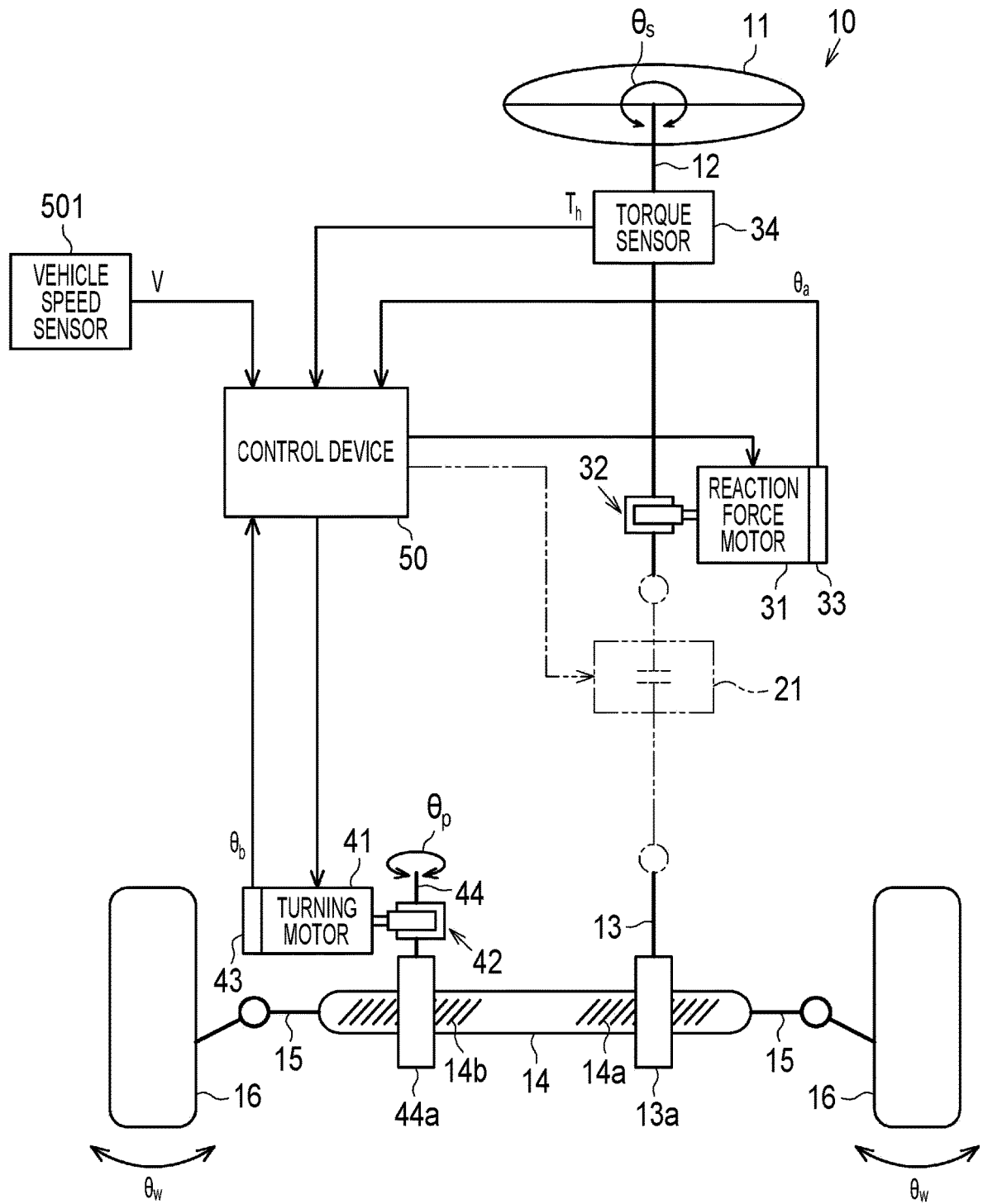
FIG. 1 is a configuration diagram of a steer-by-wire type steering device equipped with a steering control device according to a first embodiment.

As shown in FIG. 1, a steering device 10 of a vehicle has a steering shaft 12 connected to a steering wheel 11. Further, the steering device 10 has a turning shaft 14 extending along a vehicle width direction (right and left direction in FIG. 1). Right and left turning wheels 16 are connected to both ends of the turning shaft 14 via tie rods 15, respectively. A turning angle $\theta_w$ of the turning wheels 16 is changed by the linear motion of the turning shaft 14. The steering shaft 12 and the turning shaft 14 constitute a steering mechanism of the vehicle.

Further, the steering device 10 has a reaction force motor 31, a reduction mechanism 32, a rotation angle sensor 33, and a torque sensor 34, as a configuration for generating a steering reaction force. Furthermore, the steering reaction force refer to a force acting in the direction opposite to the operating direction of the steering wheel 11 by a driver. By applying the steering reaction force to the steering wheel 11, it is possible to give the driver an appropriate feeling of response.

The reaction force motor 31 is a source of a steering reaction force. As the reaction force motor 31, for example, a three-phase brushless motor is employed. A rotating shaft of the reaction force motor 31 is connected to the steering shaft 12 via the reduction mechanism 32. A torque of the reaction force motor 31 is applied to the steering shaft 12 as a steering reaction force.

The rotation angle sensor 33 is provided in the reaction force motor 31. The rotation angle sensor 33 detects a rotation angle $\theta_a$ of the reaction force motor 31. The rotation angle $\theta_a$ of the reaction force motor 31 is used to calculate a steering angle $\theta_s$. The reaction force motor 31 and the steering shaft 12 are interlocked with each other via the reduction mechanism 32. For this reason, there is a correlation between the rotation angle $\theta_a$ of the reaction force motor 31 and the rotation angle of the steering shaft 12, and, by extension, the steering angle $\theta_s$, which is the rotation angle of the steering wheel 11. Therefore, the steering angle $\theta_s$ can be obtained based on the rotation angle $\theta_a$ of the reaction force motor 31.

The torque sensor 34 detects a steering torque $T_h$, which is the torque applied to the steering shaft 12 through the rotation operation of the steering wheel 11. The torque sensor 34 detects the steering torque $T_h$ applied to the steering shaft 12 based on the amount of twist of a torsion bar provided in the middle of the steering shaft 12. The torque sensor 34 is provided at a portion of the steering shaft 12 that is closer to the steering wheel 11 than the reduction mechanism 32.

Further, the steering device 10 has a turning motor 41, a reduction mechanism 42, and a rotation angle sensor 43, as a configuration for generating a turning force which is a power for turning the turning wheels 16.

The turning motor 41 is a source of a turning force. As the turning motor 41, for example, a three-phase brushless motor is employed. The rotating shaft of the turning motor 41 is connected to a pinion shaft 44 via the reduction mechanism 42. Pinion teeth 44a of the pinion shaft 44 are meshed with rack teeth 14b of the turning shaft 14. The torque of the turning motor 41 is applied to the turning shaft 14 as a turning force via the pinion shaft 44. In response to the rotation of the turning motor 41, the turning shaft 14 moves in a vehicle width direction, which is a right and left direction in FIG. 1.

The rotation angle sensor 43 is provided in the turning motor 41. The rotation angle sensor 43 detects a rotation angle $\theta_b$ of the turning motor 41. Furthermore, the steering device 10 has a pinion shaft 13. The pinion shaft 13 is provided so as to intersect the turning shaft 14. Pinion teeth 13a of the pinion shaft 13 are meshed with rack teeth 14a of the turning shaft 14. The reason for providing the pinion shaft 13 is to support the turning shaft 14 together with the pinion shaft 44 inside a housing (not shown). That is, the turning shaft 14 is movably supported along an axial direction by a support mechanism (not shown) provided in the steering device 10, and is pressed toward the pinion shafts 13 and 44. In this way, the turning shaft 14 is supported inside the housing. Note that another support mechanism for supporting the turning shaft 14 on the housing may be provided without using the pinion shaft 13.

Further, the steering device 10 has a control device 50. The control device 50 controls the reaction force motor 31 and the turning motor 41 based on the detection results of various sensors mounted on the vehicle. The sensors include a vehicle speed sensor 501, in addition to the rotation angle sensor 33, the torque sensor 34, and the rotation angle sensor 43 described above. The vehicle speed sensor 501 detects a vehicle speed V, which is a traveling speed of the vehicle.

The control device 50 executes reaction force control for generating a steering reaction force corresponding to a steering torque $T_h$ through the control of the reaction force motor 31. The control device 50 calculates a target steering reaction force based on the steering torque $T_h$ and the vehicle speed V, and calculates a steering reaction force command value based on the calculated target steering reaction force. The control device 50 supplies, to the reaction force motor 31, a current needed to generate the steering reaction force according to the steering reaction force command value.

The control device 50 executes turning control for turning the turning wheels 16 according to the steering condition through the control of the turning motor 41. The control device 50 calculates a pinion angle $\theta_p$, which is the actual rotation angle of the pinion shaft 44, based on the rotation angle $\theta_b$ of the turning motor 41 detected through the rotation angle sensor 43. The pinion angle $\theta_p$ is a value in which a turning angle $\theta_w$ of the turning wheels 16 is reflected. Further, the control device 50 calculates the steering angle $\theta_s$ based on the rotation angle $\theta_a$ of the reaction force motor 31 detected through the rotation angle sensor 33, and calculates the target pinion angle, which is the target value of the pinion angle $\theta_p$, based on the calculated steering angle $\theta_s$. Then, the control device 50 obtains a deviation between the target pinion angle and the actual pinion angle $\theta_p$, and controls power feeding to the turning motor 41 to eliminate the deviation.

Figure 2:
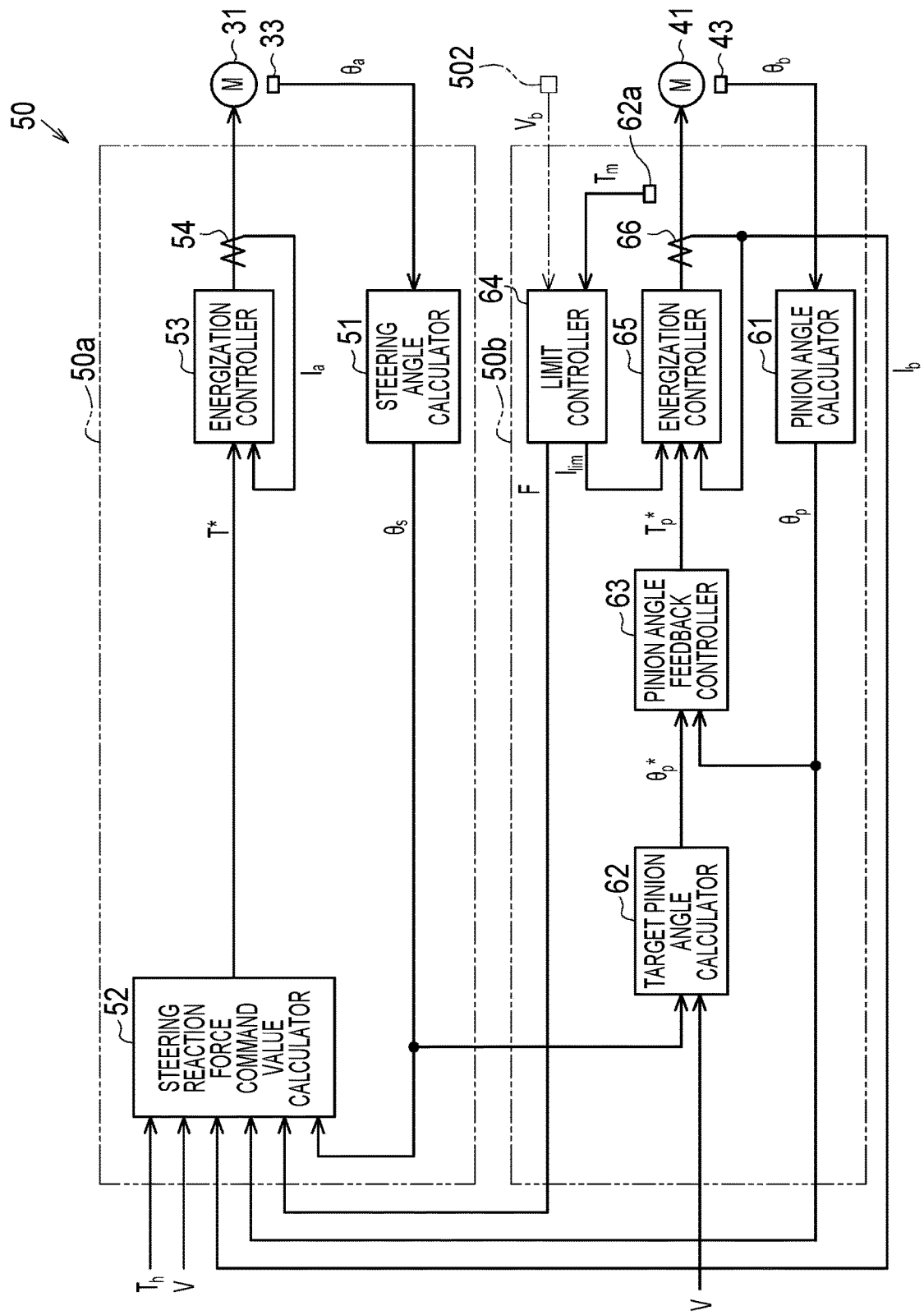
FIG. 2 is a block diagram of a control device according to the first embodiment.

Next, the control device 50 will be described in detail. As shown in FIG. 2, the control device 50 includes a reaction force controller 50a that executes reaction force control and a turning controller 50b that executes turning control.

The reaction force controller 50a includes a steering angle calculator 51, a steering reaction force command value calculator 52, and an energization controller 53. The steering angle calculator 51 calculates the steering angle $\theta_s$ of the steering wheel 11 based on the rotation angle $\theta_a$ of the reaction force motor 31 detected through the rotation angle sensor 33.

The steering reaction force command value calculator 52 calculates a steering reaction force command value T* based on the steering torque $T_h$ and the vehicle speed V. The steering reaction force command value calculator 52 calculates a steering reaction force command value T* of a larger absolute value as the absolute value of the steering torque $T_h$ is larger and the vehicle speed V is slower. The steering reaction force command value calculator 52 will be described in detail later.

The energization controller 53 supplies electric power according to the steering reaction force command value T* to the reaction force motor 31. Specifically, the energization controller 53 calculates a current command value for the reaction force motor 31 based on the steering reaction force command value T*. Further, the energization controller 53 detects a value of an actual current $I_a$ generated in a power feeding path for the reaction force motor 31 through a current sensor 54 provided in the power feeding path. The value of the current $I_a$ is the value of the actual current supplied to the reaction force motor 31. Then, the energization controller 53 obtains a deviation between the current command value and the value of the actual current $I_a$, and controls power feeding to the reaction force motor 31 to eliminate the deviation. In this way, the reaction force motor 31 generates a torque according to the steering reaction force command value T*. It is possible to give the driver an appropriate feeling of response corresponding to the road surface reaction force.

The turning controller 50b includes a pinion angle calculator 61, a target pinion angle calculator 62, a pinion angle feedback controller 63, a limit controller 64, and an energization controller 65. The pinion angle calculator 61 calculates the pinion angle $\theta_p$, which is the actual rotation angle of the pinion shaft 44, based on the rotation angle $\theta_b$ of the turning motor 41 detected through the rotation angle sensor 43. The turning motor 41 and the pinion shaft 44 are interlocked with each other through the reduction mechanism 42. Therefore, there is a correlation between the rotation angle $\theta_b$ of the turning motor 41 and the pinion angle $\theta_p$. Using the correlation, the pinion angle $\theta_p$ can be obtained from the rotation angle $\theta_b$ of the turning motor 41. Further, the pinion shaft 44 is meshed with the turning shaft 14. Therefore, there is also a correlation between the pinion angle $\theta_p$ and the amount of movement of the turning shaft 14. That is, the pinion angle $\theta_p$ is a value in which the turning angle $\theta_w$ of the turning wheels 16 is reflected.

The target pinion angle calculator 62 calculates a target pinion angle $\theta_p^*$ based on the steering angle $\theta_s$ calculated by the steering angle calculator 51 and the vehicle speed V detected through the vehicle speed sensor 501. The target pinion angle calculator 62 sets a steering angle ratio, which is a ratio of a turning angle $\theta_w$ to the steering angle $\theta_s$, according to, for example, the vehicle speed V, and calculates the target pinion angle $\theta_p^*$ according to the set steering angle ratio. The target pinion angle calculator 62 calculates the target pinion angle $\theta_p^*$ such that the turning angle $\theta_w$ with respect to the steering angle $\theta_s$ becomes larger as the vehicle speed V becomes slower, and the turning angle $\theta_w$ with respect to the steering angle $\theta_s$ becomes larger as the vehicle speed V becomes faster.

Furthermore, depending on the product specifications and the like, the target pinion angle calculator 62 may set the target pinion angle $\theta_p^*$ to the same value as the steering angle $\theta_s$. In this case, the steering angle ratio, which is the ratio of the steering angle $\theta_s$ to the turning angle $\theta_w$, is "1:1".

The pinion angle feedback controller 63 takes in the target pinion angle $\theta_p^*$ calculated by the target pinion angle calculator 62 and the actual pinion angle $\theta_p$ calculated by the pinion angle calculator 61. The pinion angle feedback controller 63 calculates a pinion angle command value $T_p^*$ through feedback control of the pinion angle $\theta_p$ such that the actual pinion angle $\theta_p$ follows the target pinion angle $\theta_p^*$.

The limit controller 64 calculates a limit value $I_{lim}$ for limiting the amount of current supplied to the turning motor 41, for example, according to the heat generation state of the turning motor 41. The limit value $I_{lim}$ is set as an upper limit value of the amount of current supplied to the turning motor 41 based on the standpoint of protecting the turning motor 41 from overheating. The limit controller 64 calculate the limit value $I_{lim}$ based on a comparison result between a temperature $T_m$ of the turning motor 41 detected through a temperature sensor 62a provided in the vicinity of a power feeding path for the turning motor 41 and a temperature threshold value.

When the temperature $T_m$ of the turning motor 41 does not exceed the temperature threshold value, the limit controller 64 calculates the limit value $I_{lim}$ having an absolute value large enough not to limit the current that the energization controller 65 tries to supply to the turning motor 41, based on the maximum current value that can be applied without overheating the turning motor 41. On the other hand, when the temperature $T_m$ of the turning motor 41 exceeds the temperature threshold value, the limit controller 64 calculates the limit value $I_{lim}$ having an absolute value smaller than the maximum current value that can be applied to the turning motor 41 without overheating the turning motor 41. The limit controller 64 calculates the limit value $I_{lim}$ having an absolute value smaller as the temperature $T_m$ of the turning motor 41 is higher.

Furthermore, the limit value $I_{lim}$ may be a fixed value. The limit value $I_{lim}$, which is a fixed value, is stored in a storage device of the control device 50. In the case where the above configuration is employed, when the temperature $T_m$ of the turning motor 41 exceeds the temperature threshold value, the limit controller 64 may set a limit value $I_{lim}$, which is a fixed value, as the limit value $I_{lim}$ for the amount of current of the turning motor 41 regardless of the temperature $T_m$ of the turning motor 41. Further, when the temperature $T_m$ of the turning motor 41 does not exceed the temperature threshold value, the limit controller 64 may not set the limit value $I_{lim}$ for the amount of current of the turning motor 41.

The limit controller 64 sets a value of a flag F based on whether the temperature $T_m$ of the turning motor 41 exceeds the temperature threshold value, that is, whether a situation occurs in which the amount of current of the turning motor 41 has to be limited. The limit controller 64 sets the value of the flag F to "1" when the temperature $T_m$ of the turning motor 41 exceeds the temperature threshold value, that is, when the situation occurs in which the amount of current of the turning motor 41 has to be limited. The limit controller 64 sets the value of the flag F to "0" when the temperature $T_m$ of the turning motor 41 does not exceed the temperature threshold value, that is, when the situation does not occur in which the amount of current of the turning motor 41 has to be limited.

The energization controller 65 supplies electric power according to a pinion angle command value $T_p^*$ to the turning motor 41. Specifically, the energization controller 65 calculates a current command value for the turning motor 41 based on the pinion angle command value $T_p^*$. Further, the energization controller 65 detects a value of an actual current $I_b$ generated in the power feeding path for the turning motor 41 through a current sensor 66 provided in the power feeding path. The value of the current $I_b$ is the value of the actual current supplied to the turning motor 41. Then, the energization controller 65 obtains a deviation between the current command value and the value of the actual current $I_b$, and controls the power feeding to the turning motor 41 to eliminate the deviation (feedback control of the current $I_b$). In this way, the turning motor 41 rotates by an angle according to the pinion angle command value $T_p^*$.

When the limit value $I_{lim}$ is calculated by the limit controller 64, the energization controller 65 limits the amount of current supplied to the turning motor 41 according to the limit value $I_{lim}$. The energization controller 65 compares the absolute value of the current to be supplied to the turning motor 41 with the limit value $I_{lim}$. When the absolute value of the current to be supplied to the turning motor 41 is larger than the limit value $I_{lim}$, the energization controller 65 limits the absolute value of the current supplied to the turning motor 41 to the limit value $I_{lim}$. In this way, the torque generated by the turning motor 41 is limited to the torque according to the limit value $I_{lim}$. On the other hand, when the absolute value of the current to be supplied to the turning motor 41 is equal to or less than the limit value $I_{lim}$, the energization controller 65 supplies the original current calculated through the feedback control of the current $I_b$ to the turning motor 41 as it is. The torque generated by the turning motor 41 is not limited.

Figure 3:
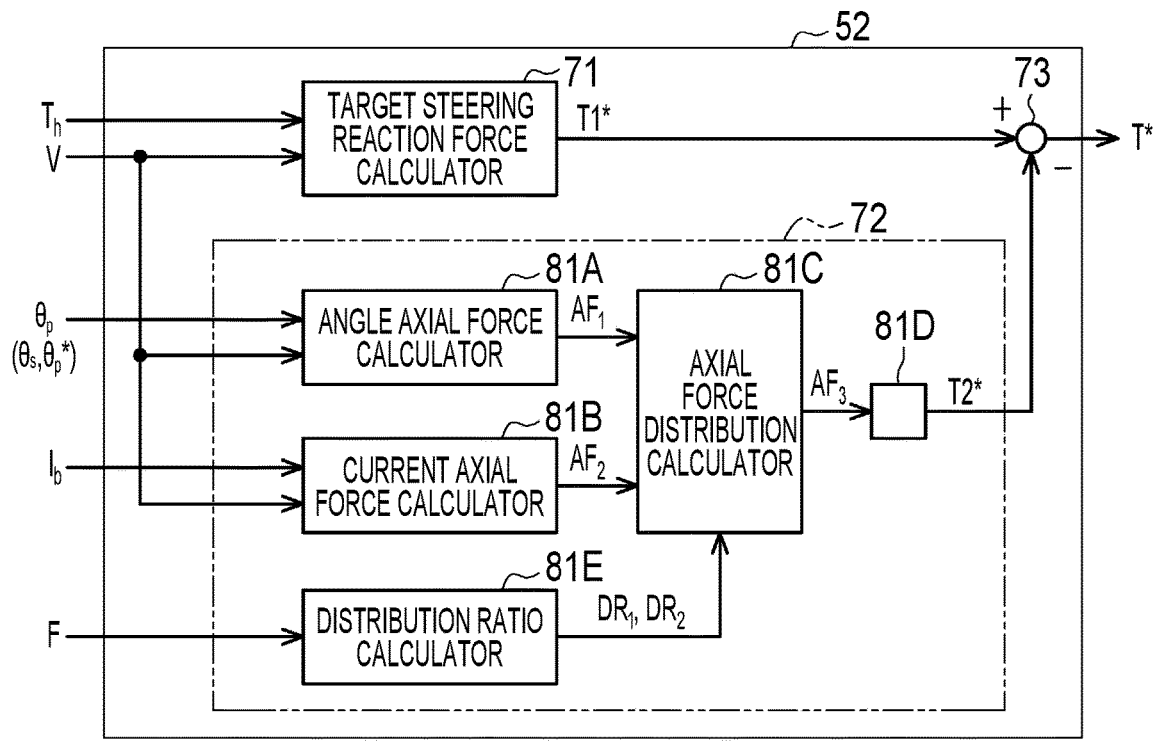
FIG. 3 is a block diagram of a steering reaction force command value calculator according to the first embodiment.

Next, the steering reaction force command value calculator 52 will be described in detail. As shown in FIG. 3, the steering reaction force command value calculator 52 includes a target steering reaction force calculator 71, an axial force calculator 72, and a subtractor 73.

The target steering reaction force calculator 71 calculates the target steering reaction force T1* based on the steering torque $T_h$ and the vehicle speed V. The target steering reaction force T1* is a target value of the torque acting in the direction opposite to the operating direction of the steering wheel 11 to be generated through the reaction force motor 31. The target steering reaction force calculator 71 calculates the target steering reaction force T1* of a larger absolute value as the absolute value of the steering torque $T_h$ is larger and the vehicle speed V is slower.

The axial force calculator 72 calculates the axial force acting on the turning shaft 14 based on the pinion angle $\theta_p$, the value of the current $I_b$ of the turning motor 41, and the vehicle speed V, and calculates a torque conversion value T2* by converting the calculated axial force into the torque for the steering wheel 11 or the steering shaft 12. The axial force calculator 72 will be described in detail later.

The subtractor 73 calculates the steering reaction force command value T* by subtracting the torque conversion value T2* calculated by the axial force calculator 72 from the target steering reaction force T1* calculated by the target steering reaction force calculator 71.

Next, the axial force calculator 72 will be described in detail. As shown in FIG. 3, the axial force calculator 72 includes an angle axial force calculator 81A, a current axial force calculator 81B, an axial force distribution calculator 81C, and a converter 81D.

The angle axial force calculator 81A calculates an angle axial force $AF_1$, which is an ideal value of the axial force acting on the turning shaft 14, based on the pinion angle $\theta_p$. The angle axial force calculator 81A calculates the angle axial force $AF_1$ by using, for example, an angle axial force map stored in the storage device of the control device 50. The angle axial force map is a map in which the horizontal axis represents the pinion angle $\theta_p$ and the vertical axis represents the angle axial force $AF_1$, and a relationship between the pinion angle $\theta_p$ and the angle axial force $AF_1$ is defined according to the vehicle speed V. The angle axial force map has the following characteristics. That is, the angle axial force $AF_1$ is set to a larger absolute value as the absolute value of the pinion angle $\theta_p$ increases and the vehicle speed V becomes slower. The absolute value of the angle axial force $AF_1$ increases linearly with the increase of the absolute value of the pinion angle $\theta_p$. The angle axial force $AF_1$ is set to have the same sign as the pinion angle $\theta_p$. The angle axial force $AF_1$ is an axial force in which the road surface condition or the force acting on the turning shaft 14 is not reflected.

The current axial force calculator 81B calculates a current axial force $AF_2$ acting on the turning shaft 14 based on the value of the current $I_b$ of the turning motor 41. Here, the value of the current $I_b$ of the turning motor 41 is due to the fact that disturbances caused by the road surface condition such as a road surface friction resistance act on the turning wheels 16, and varies depending on the difference generated between the target pinion angle $\theta_p^*$ and the actual pinion angle $\theta_p$. That is, in the value of the current $I_b$ of the turning motor 41, the actual road surface condition acting on the turning wheels 16 is reflected. Therefore, it is possible to calculate the axial force in which the influence of the road surface condition is reflected, based on the value of the current $I_b$ of the turning motor 41. The current axial force $AF_2$ is obtained, for example, by multiplying the gain, which is a coefficient according to the vehicle speed V, by the value of the current $I_b$ of the turning motor 41. The current axial force $AF_2$ is an axial force in which the road surface condition or the force acting on the turning shaft 14 through the turning wheels 16 are reflected.

The axial force distribution calculator 81C individually sets distribution ratios of the angle axial force $AF_1$ and the current axial force $AF_2$ according to various vehicle state variables. The vehicle state variables are variables in which a condition of the vehicle, including a vehicle behavior, the steering condition, or the road surface condition is reflected, and examples thereof may include the yaw rate, lateral acceleration, steering angle $\theta_s$, pinion angle $\theta_p$, and vehicle speed V, steering velocity, and pinion angular velocity. The steering velocity is obtained by differentiating the steering angle $\theta_s$. The pinion angular velocity is obtained by differentiating the pinion angle $\theta_p$.

The axial force distribution calculator 81C adds up the values obtained by multiplying the angle axial force $AF_1$ and the current axial force $AF_2$ by the individually set distribution ratios, respectively, thereby calculating the final axial force $AF_3$, which is the final axial force to be reflected in the steering reaction force command value T*. The final axial force $AF_3$ is expressed by the following equation (1).

$$AF_3 = AF_1 \cdot DR_1 + AF_2 \cdot DR_2 \quad (1)$$

Note that "$DR_1$" is the distribution ratio of the angle axial force $AF_1$, and "$DR_2$" is the distribution ratio of the current axial force $AF_2$. The distribution ratio $DR_1$ indicates the degree to which the angle axial force $AF_1$ is reflected in the final axial force $AF_3$. The distribution ratio $DR_2$ indicates the degree to which the current axial force $AF_2$ is reflected in the final axial force $AF_3$.

The axial force distribution calculator 81C sets each of two distribution ratios $DR_1$, $DR_2$ based on various vehicle state variables in which the traveling state or steering condition of the vehicle is reflected. Further, the axial force distribution calculator 81C can set values of the two distribution ratios $DR_1$, $DR_2$ in the range of "0 (0%)" to "1 (100%)", for example, in increments of "0.1", based on the product specifications and the like. Note that the axial force distribution calculator 81C sets each of the values of the two distribution ratios $DR_1$, $DR_2$ such that the sum of the values of the two distribution ratios $DR_1$, $DR_2$ is "1".

The converter 81D calculates the torque conversion value T2* by converting the final axial force $AF_3$ calculated by the axial force distribution calculator 81C into the torque for the steering wheel 11. With the steering device 10 configured in this way, the torque conversion value T2* obtained by converting the final axial force $AF_3$ calculated by the axial force calculator 72 into the torque is reflected in the steering reaction force command value T*, thereby making it possible to apply, to the steering wheel 11, the steering reaction force according to the vehicle behavior or the road surface condition. Therefore, the driver can grasp the vehicle behavior or the road surface condition by feeling the steering reaction force through the steering wheel 11 as a response.

However, in the steering device 10, the following limitations are likely to arise. That is, when the amount of current of the turning motor 41 is limited through the execution of the overheat protection function of the turning motor 41, the current axial force $AF_2$, and, by extension, the torque generated by the turning motor 41 may decrease due to the limitation of the amount of current. Therefore, for example, a limitation is likely to arise that the originally demanded steering reaction force cannot be secured even in the situation in which the steering reaction force has to be further increased as information for the driver.

Therefore, the following configuration is employed as the axial force calculator 72. As shown in FIG. 3, the axial force calculator 72 has a distribution ratio calculator 81E. The distribution ratio calculator 81E takes in the value of the flag F set by the limit controller 64. When the value of the flag F is "1", the distribution ratio calculator 81E sets values of distribution ratios $DR_1$, $DR_2$ for use at the time of current limit of the turning motor 41. The distribution ratios $DR_1$, $DR_2$ for use at the time of current limit are used in preference to the distribution ratios $DR_1$, $DR_2$ calculated by the axial force distribution calculator 81C.

When the value of the flag F is "1", that is, when a situation occurs in which the amount of current of the turning motor 41 has to be limited, the distribution ratio calculator 81E sets the value of the distribution ratio $DR_1$ of the angle axial force $AF_1$ to the final axial force $AF_3$ to "1 (100%)", and meanwhile, sets the value of the distribution ratio $DR_2$ of the current axial force $AF_2$ to the final axial force $AF_3$ to "0 (0%)". Further, when the value of the flag F is "0", that is, when the situation does not occur in which the amount of current of the turning motor 41 has to be limited, the distribution ratio calculator 81E does not set the distribution ratios $DR_1$, $DR_2$ for use at the time of current limit.

When the distribution ratios $DR_1$, $DR_2$ for use at the time of current limit are set by the distribution ratio calculator 81E, the axial force distribution calculator 81C uses the distribution ratios $DR_1$, $DR_2$ in preference to the distribution ratios $DR_1$, $DR_2$ calculated by the axial force distribution calculator 81C. Here, the value of the distribution ratio $DR_1$ for use at the time of current limit for the angle axial force $AF_1$ is set to "1 (100%)", while the value of the distribution ratio $DR_2$ for use at the time of current limit for the current axial force $AF_2$ is set to "0 (0%)". Therefore, as can be seen from the above equation (1), the value of the final axial force $AF_3$ is the same as the value of the angle axial force $AF_1$ calculated by the angle axial force calculator 81A. That is, the angle axial force $AF_1$ calculated by the angle axial force calculator 81A is used as it is as the final axial force $AF_3$ to control the reaction force motor 31.

Furthermore, depending on the product specifications and the like, the axial force distribution calculator 81C may have the function of the distribution ratio calculator 81E. In this case, as the axial force calculator 72, it is possible to employ a configuration in which the distribution ratio calculator 81E is omitted. The axial force distribution calculator 81C takes in the value of the flag F set by the limit controller 64. When the value of the flag F is "1", the axial force distribution calculator 81C sets values of distribution ratios $DR_1$, $DR_2$ for use at the time of current limit of the turning motor 41. The distribution ratios $DR_1$, $DR_2$ for use at the time of current limit are used in preference to the distribution ratios $DR_1$, $DR_2$, which are calculated according to various vehicle state variables in which the vehicle behavior, the steering condition, or the road surface condition is reflected.

Next, operations of the first embodiment will be described. In a normal state where the current of the turning motor 41 is not limited, the control device 50 controls the reaction force motor 31 by calculating the final axial force $AF_3$ by adding up the angle axial force $AF_1$ and the current axial force $AF_2$ at a distribution ratio set according to the vehicle behavior, steering condition or the road surface condition, and using the calculated final axial force $AF_3$. The angle axial force $AF_1$ is an ideal axial force based on the pinion angle $\theta_p$, where the road surface condition is not reflected. The current axial force $AF_2$ is an axial force based on the value of the current $I_b$ of the turning motor 41, where the road surface condition is reflected. Therefore, the reaction force motor 31 generates the steering reaction force according to the vehicle behavior, the steering condition, or the road surface condition. Therefore, the driver can grasp the vehicle behavior, the steering condition, or the road surface condition by feeling the steering reaction force through the steering wheel 11 as a response.

Next, when the current of the turning motor 41 is limited from the standpoint of overheat protection of the turning motor 41, the control device 50 limits the amount of current supplied to the turning motor 41 by using the limit value $I_{lim}$ set by the limit controller 64. By limiting the value of the current $I_b$ of the turning motor 41 to at least the limit value $I_{lim}$, the temperature rise of the turning motor 41 is suppressed, and the current $I_b$ of the turning motor 41 is decreased, and as the current decreases, the temperature of the turning motor 41 gradually decreases, and eventually reaches a temperature below the temperature threshold value. As a result, the turning motor 41 is protected from overheating.

Further, when the current of the turning motor 41 is limited from the standpoint of overheat protection of the turning motor 41, the control device 50 reflects, in the steering reaction force command value T*, just the angle axial force $AF_1$, which is not affected by the change in the current $I_b$ of the turning motor 41, out of the angle axial force $AF_1$ and the current axial force $AF_2$. Specifically, the control device 50 sets the distribution ratio $DR_1$ of the angle axial force $AF_1$ to the final axial force $AF_3$ to "1 (100%)", and meanwhile, sets the distribution ratio $DR_2$ of the current axial force $AF_2$ to the final axial force $AF_3$ to "0 (0%)". Since the current axial force $AF_2$ affected by the change in the current $I_b$ of the turning motor 41 is not reflected in the steering reaction force command value T*, the torque generated by the reaction force motor 31 is not affected by the change in the current $I_b$ of the turning motor 41. Therefore, the steering reaction force applied to the steering wheel 11 is not limited as the current $I_b$ of the turning motor 41 is limited.

Even when the current $I_b$ of the turning motor 41 is limited, the steering reaction force corresponding to the pinion angle $\theta_p$ is applied to the steering wheel 11 by reflecting, in the steering reaction force command value T*, just the angle axial force $AF_1$ according to the pinion angle $\theta_p$ out of the angle axial force $AF_1$ and the current axial force $AF_2$. For example, the angle axial force $AF_1$ is set to a larger absolute value as the absolute value of the pinion angle $\theta_p$ increases. Therefore, in a situation where the steering reaction force has to be increased as information for the driver, for example, when the steering wheel 11 is steered more, appropriate steering reaction force according to the pinion angle $\theta_p$ is applied to the steering wheel 11 as information for the driver.

Therefore, according to the first embodiment, the following effects can be obtained. When a specific situation occurs in which the current $I_b$ of the turning motor 41 has to be limited, the current axial force $AF_2$ calculated based on the current $I_b$ of the turning motor 41 is not used, and the angle axial force $AF_1$, which is not affected by the current limit of the turning motor 41, is calculated as the final axial force $AF_3$, which is the final axial force reflected in the steering reaction force command value T*. Therefore, it is possible to secure the steering reaction force as information for the driver even when the current of the turning motor 41 is limited. Further, both the steering feel during normal operation of the system in which the current $I_b$ of the turning motor 41 is not limited and the steering feel during the protective operation of the system in which the current $I_b$ of the turning motor 41 is limited can be compatible.

When the specific situation occurs in which the current $I_b$ of the turning motor 41 has to be limited, the distribution ratio calculator 81E sets the distribution ratio of the current axial force $AF_2$ to the final axial force $AF_3$ to 0%, and meanwhile, sets the distribution ratio of the angle axial force $AF_1$ to the final axial force $AF_3$ to 100%. Therefore, when the specific situation occurs in which the current $I_b$ of the turning motor 41 has be limited, the final axial force $AF_3$ is calculated by using the distribution ratios $DR_1$, $DR_2$ for use at the time of current limit, which are calculated by the distribution ratio calculator 81E, and thus it is possible to secure the steering reaction force as information for the driver even when the current of the turning motor 41 is limited.

Second Embodiment

Next, a second embodiment in which a steering control device is embodied as a steer-by-wire type steering device will be described. The embodiment basically has the same configuration as the first embodiment shown in FIGS. 1 and 2. The embodiment is different from the first embodiment in the configuration of the axial force calculator 72.

Figure 4:
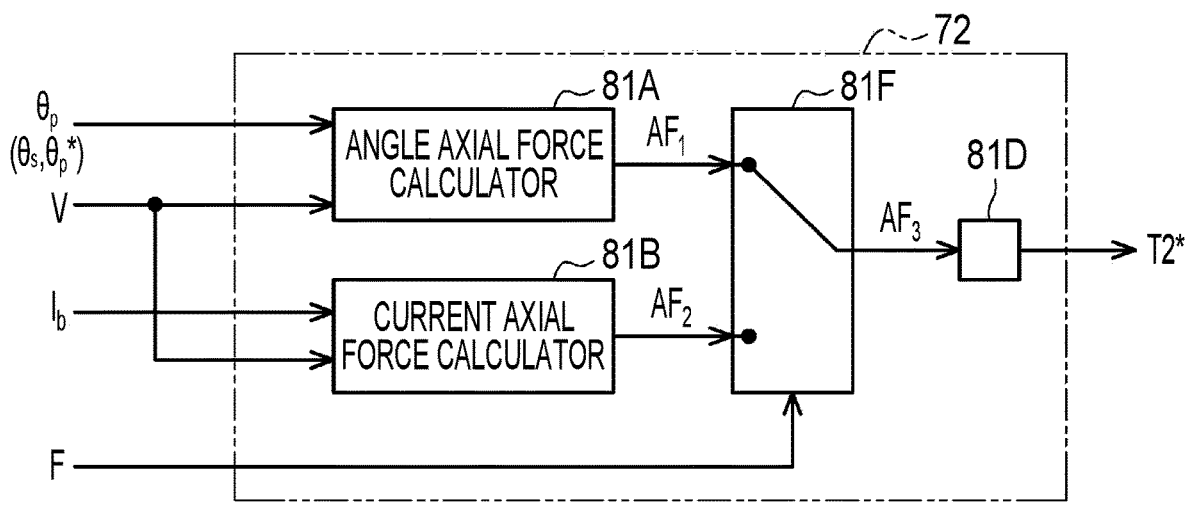
FIG. 4 is a block diagram of an axial force calculator according to a second embodiment.

As shown in FIG. 4, the axial force calculator 72 includes the angle axial force calculator 81A, the current axial force calculator 81B, the converter 81D, and a switch 81F. The switch 81F takes in the angle axial force $AF_1$ calculated by the angle axial force calculator 81A and the current axial force $AF_2$ calculated by the current axial force calculator 81B as data inputs. Further, the switch 81F takes in the value of the flag F set by the limit controller 64 as a control input. The switch 81F selects as the final axial force $AF_3$, which is the final axial force used to control the reaction force motor 31, either the angle axial force $AF_1$ calculated by the angle axial force calculator 81A or a current axial force $AF_2$ calculated by the current axial force calculator 81B, based on the value of the flag F.

When the value of the flag F is "0", the switch 81F selects the current axial force $AF_2$ calculated by the current axial force calculator 81B as the final axial force $AF_3$. When the value of the flag F is "1", the switch 81F selects the angle axial force $AF_1$ calculated by the angle axial force calculator 81A as the final axial force $AF_3$.

Next, operations of the second embodiment will be described. In the normal state where the current of the turning motor 41 is not limited, the control device 50 controls the reaction force motor 31 by selecting, as the final axial force $AF_3$, the current axial force $AF_2$ out of the angle axial force $AF_1$ and the current axial force $AF_2$, based on the current $I_b$ of the turning motor 41, and using the selected final axial force $AF_3$. The current axial force $AF_2$ is an axial force based on the current $I_b$ of the turning motor 41, where the road surface condition is reflected. Therefore, the reaction force motor 31 generates the steering reaction force according to the vehicle behavior, or the road surface condition. Therefore, the driver can grasp the vehicle behavior, or the road surface condition by feeling the steering reaction force through the steering wheel 11 as a response.

Further, when the current of the turning motor 41 is limited from the standpoint of overheat protection of the turning motor 41, the control device 50 selects, as the final axial force $AF3$, the angle axial force $AF_1$, which is not affected by the change in the current $I_b$ of the turning motor 41, out of the angle axial force $AF_1$ and the current axial force $AF_2$. Since the current axial force $AF_2$ affected by the change in the current $I_b$ of the turning motor 41 is not reflected in the steering reaction force command value T*, the torque generated by the reaction force motor 31 is not affected by the change in the current $I_b$ of the turning motor 41. Therefore, the steering reaction force applied to the steering wheel 11 is not limited as the current $I_b$ of the turning motor 41 is limited. Even when the current $I_b$ of the turning motor 41 is limited, an appropriate steering reaction force according to the pinion angle $\theta_p$ is applied to the steering wheel 11 as information for the driver.

Therefore, according to the second embodiment, the following effects can be obtained in addition to the same effects as those of the first embodiment. When the current $I_b$ of the turning motor 41 is limited, the axial force reflected in the steering reaction force command value T* can be switched from the current axial force $AF_2$ to the angle axial force $AF_1$ simply by the operation of the switch 81F. Therefore, it is possible to reduce the calculation load of the control device 50.

Third Embodiment

Next, a third embodiment in which a steering control device is embodied as a steer-by-wire type steering device will be described. The embodiment basically has the same configuration as the first embodiment shown in FIGS. 1 to 3. The embodiment may be applied to the second embodiment.

In the first embodiment, as the situation in which the current of the turning motor 41 has to be limited, a situation in which the turning motor 41 approaches an overheating state is given as an example, but a situation in which the power supply voltage of the vehicle is lowered may be included.

The limit controller 64 calculates the limit value $I_{lim}$ for limiting the amount of current supplied to the turning motor 41 according to a voltage $V_b$ of a DC power supply, such as a battery, detected through a voltage sensor 502 shown by the two-dot chain line in FIG. 2 shown above. The limit value $I_{lim}$ is set as an upper limit value of the amount of current supplied to the turning motor 41 from the standpoint of suppressing a decrease in the voltage $V_b$ of the DC power supply. When the voltage $V_b$ of the DC power supply detected through the voltage sensor 502 is equal to or less than the voltage threshold value, the limit controller 64 calculates the limit value $I_{lim}$ according to the voltage value at that time. The voltage threshold value is set with reference to the lower limit value of a guaranteed operation voltage range in which the operation of the turning motor 41 is guaranteed.

Further, the limit controller 64 sets the value of the flag F based on whether the voltage $V_b$ of the DC power supply is equal to or less than the voltage threshold value, that is, whether the voltage $V_b$ of the DC power supply is lowered. The limit controller 64 sets the value of the flag F to "1" when the voltage $V_b$ of the DC power supply is equal to or less than the voltage threshold value, that is, when the voltage $V_b$ of the DC power supply is lowered. The limit controller 64 sets the value of the flag F to "0" when the voltage $V_b$ of the DC power supply is not equal to or less than the voltage threshold value, that is, when the voltage $V_b$ of the DC power supply is not lowered.

Therefore, according to the third embodiment, the following effects can be obtained. By limiting the current $I_b$ supplied to the turning motor 41 when the power supply voltage of the vehicle is lowered, it is possible to suppress a further lowering of the power supply voltage. Further, even when the current $I_b$ of the turning motor 41 is limited due to the lowering of the power supply voltage of the vehicle, it is possible to apply an appropriate steering reaction force as information for the driver by controlling the drive of the turning motor 41 using the angle axial force $AF_1$ that is not affected by the current limit of the turning motor 41.

Fourth Embodiment

Next, a fourth embodiment in which a steering control device is embodied as a steer-by-wire type steering device will be described. The embodiment basically has the same configuration as the first embodiment shown in FIGS. 1 to 3.

In the first embodiment, when a situation occurs in which the current $I_b$ of the turning motor 41 has to be limited, the distribution ratio calculator 81E sets the distribution ratio $DR_1$ of the angle axial force $AF_1$ "1 (100%)", and meanwhile, sets the distribution ratio $DR_2$ of the current axial force $AF_2$ to "0 (0%)", but the invention is not limited thereto.

For example, when a situation occurs in which the current $I_b$ of the turning motor 41 has to be limited, the value of the distribution ratio $DR_1$ of the angle axial force $AF_1$ and the value of the distribution ratio $DR_2$ of the current axial force $AF_2$ may be set as expressed by the following relational expression (2) or relational expression (3). Note that the two distribution ratios $DR_1$, $DR_2$ are set such that the sum of the two distribution ratios is "1 (100%)". Further, the two distribution ratios $DR_1$, $DR_2$ are set to appropriate values depending on the product specifications and the like.

$$DR_1:DR_2=0.8(80\%):0.2(20\%) \qquad (2)$$

$$DR_1:DR_2=0.9(90\%):0.1(10\%) \qquad (3)$$

As described above, the value of the distribution ratio $DR_1$ of the angle axial force $AF_1$ does not necessarily have to be "1 (100%)". When a specific situation occurs in which the current $I_b$ of the turning motor 41 has to be limited, the two distribution ratios $DR_1$, $DR_2$ may be set to values in which the reflection degree of the current axial force $AF_2$ in the final axial force $AF_3$ decreases, while the reflection degree of the angle axial force $AF_1$ in the final axial force $AF_3$ increases. That is, it is sufficient that the angle axial force $AF_1$ becomes more dominant in the final axial force $AF_3$.

Therefore, according to the fourth embodiment, the following effects can be obtained. When a specific situation occurs in which the current $I_b$ of the turning motor 41 has to be limited, the reflection degree of the current axial force $AF_2$ in the final axial force $AF_3$ decreases, while the reflection degree of the angle axial force $AF_1$ in the final axial force $AF_3$ increases. That is, since the angle axial force $AF_1$ becomes more dominant in the final axial force $AF_3$, even when the current $I_b$ of the turning motor 41 is limited, the steering reaction force as information for the driver can be secured.

Fifth Embodiment

Next, a fifth embodiment in which a steering control device is embodied as a steer-by-wire type steering device will be described. The embodiment basically has the same configuration as the first embodiment shown in FIGS. 1 to 3 above.

Similar to the third embodiment described above, when a plurality of situations are assumed in which the current of the turning motor 41 has to be limited, two distribution ratios $DR_1$, $DR_2$ may be different depending on the situations. The specific configuration is as follows.

In addition to setting the value of the flag F, the limit controller 64 generates unique identification information for each situation in which the current of the turning motor 41 has to be limited. The distribution ratio calculator 81E takes in the value of the flag F and the identification information. When the value of the flag F is "1", the distribution ratio calculator 81E sets the value of the distribution ratio $DR_1$ of the angle axial force $AF_1$ to the final axial force $AF_3$ and the value of the distribution ratio $DR_2$ of the current axial force $AF_2$ to the final axial force $AF_3$, according to the identification information, that is, depending on a situation in which the current of the turning motor 41 has to be limited. In this case, depending on the situation in which the current of the turning motor 41 has to be limited, the value of the distribution ratio $DR_1$ of the angle axial force $AF_1$ and the value of the distribution ratio $DR_2$ of the current axial force $AF_2$ are set to a different value. Note that the two distribution ratios $DR_1$, $DR_2$ are set such that the sum of the two distribution ratios is "1 (100%)". Further, the two distribution ratios $DR_1$, $DR_2$ are set to appropriate values depending on the product specifications and the like.

For example, when the turning motor 41 is in an overheating state, the value of the distribution ratio $DR_1$ of the angle axial force $AF_1$ and the value of the distribution ratio $DR_2$ of the current axial force $AF_2$ are set as expressed by the following relational expression (4).

$$DR_1:DR_2=1(100\%):0(0\%) \qquad (4)$$

Further, when the voltage $V_b$ of the DC power supply is lowered, the value of the distribution ratio $DR_1$ of the angle axial force $AF_1$ and the value of the distribution ratio $DR_2$ of the current axial force $AF_2$ are set as expressed by the following relational expression (5) or (6).

$$DR_1:DR_2=0.8(80\%):0.2(20\%) \qquad (5)$$

$$DR_1:DR_2=0.9(90\%):0.1(10\%) \qquad (6)$$

Therefore, according to the fifth embodiment, the following effects can be obtained.

When a specific situation occurs in which the current $I_b$ of the turning motor 41 has to be limited, the values of the two distribution ratios $DR_1$, $DR_2$ are set depending on the situation in which the current $I_b$ of the turning motor 41 has to be limited. Note that regardless of the situation in which the current $I_b$ of the turning motor 41 has to be limited, the angle axial force $AF_1$ becomes more dominant in the final axial force $AF_3$. Therefore, when a specific situation occurs in which the current $I_b$ of the turning motor 41 has to be limited, the steering reaction force can be secured as the information for the driver depending on the situation in which the current $I_b$ of the turning motor 41 has to be limited.

Sixth Embodiment

Next, a sixth embodiment in which a steering control device is embodied as a steer-by-wire type steering device will be described. The embodiment basically has the same configuration as the first embodiment shown in FIGS. 1 to 3 above. The embodiment may be applied to the third to fifth embodiments.

Figure 5:
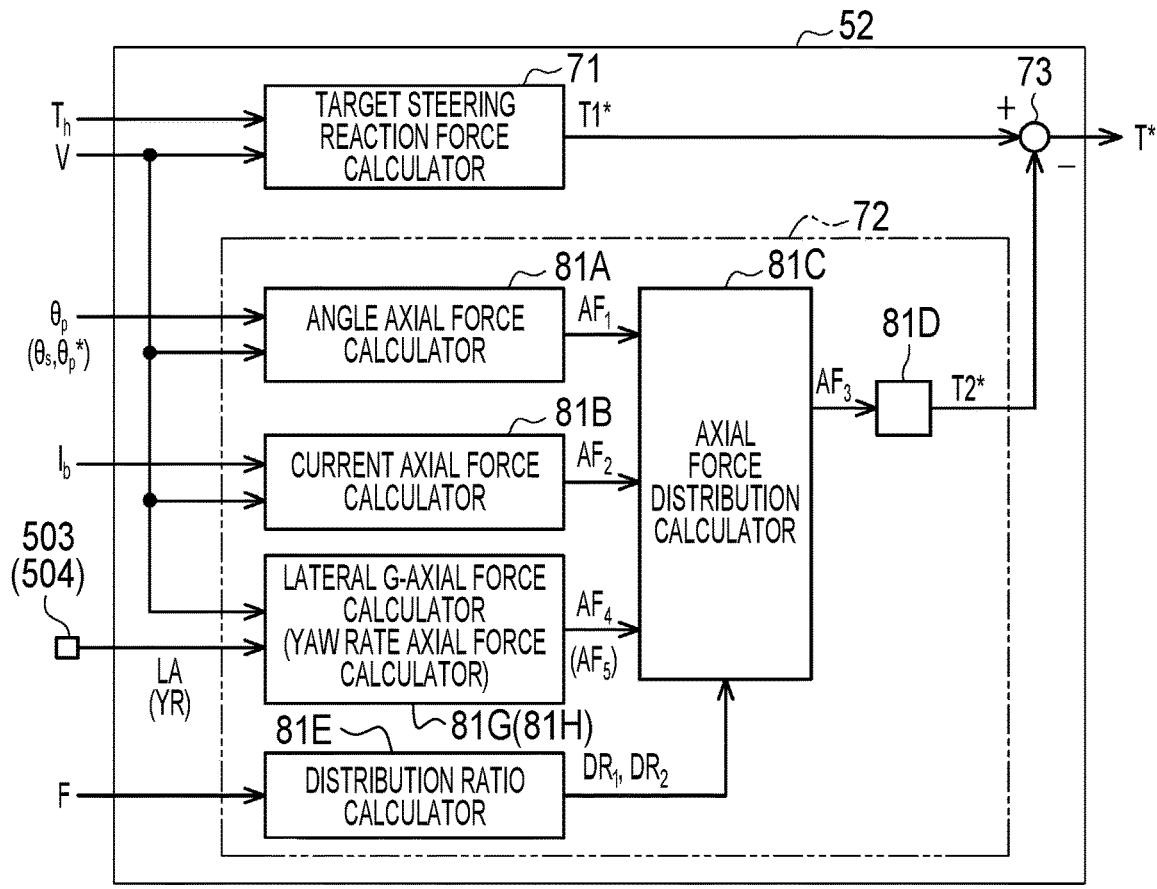
FIG. 5 is a block diagram of a steering reaction force command value calculator according to a sixth embodiment.

The following configuration may be employed for the axial force calculator 72, depending on the product specifications. That is, as shown in FIG. 5, the axial force calculator 72 has a lateral G-axial force calculator 81G, in addition to the angle axial force calculator 81A, the current axial force calculator 81B, the axial force distribution calculator 81C, the converter 81D, and the distribution ratio calculator 81E.

The lateral G-axial force calculator 81G calculates a lateral G-axial force $AF_4$, which is the axial force acting on the turning shaft 14, based on a lateral acceleration LA detected through a lateral acceleration sensor 503 provided in the vehicle. The lateral G-axial force $AF_4$ is obtained, for example, by multiplying the lateral acceleration LA by the gain, which is a coefficient according to the vehicle speed V. Since the behavior of the vehicle is reflected in the lateral acceleration LA, the behavior of the vehicle is also reflected in the lateral G-axial force $AF_4$ calculated based on the lateral acceleration LA. Since the lateral G-axial force $AF_4$ is calculated based on the lateral acceleration LA, the lateral G-axial force $AF_4$ is not easily affected by the change in the current $I_b$ of the turning motor 41.

The axial force distribution calculator 81C calculates the final axial force $AF_3$ by adding up the angle axial force $AF_1$, the current axial force $AF_2$, and the lateral G-axial force $AF_4$ at a predetermined distribution ratio set according to various vehicle state variables in which the traveling state or steering condition of the vehicle is reflected. Examples of vehicle state variables include the vehicle speed V, the steering angle $\theta_s$, and the pinion angle $\theta_p$. By reflecting this final axial force $AF_3$ in the steering reaction force command value T*, it is possible to apply a more appropriate steering reaction force to the steering wheel 11 according to the vehicle behavior. Furthermore, the final axial force $AF_3$ at this time is expressed by the following equation (7).

$$AF_3 = AF_1 \cdot DR_1 + AF_2 \cdot DR_2 + AF_4 \cdot DR_4 \quad (7)$$

Note that "$DR_1$" is the distribution ratio of the angle axial force $AF_1$, "$DR_2$" is the distribution ratio of the current axial force $AF_2$, and "$DR_4$" is the distribution ratio of the lateral G-axial force $AF_4$.

When the value of the flag F is "1", the distribution ratio calculator 81E sets values of the distribution ratios $DR_1$, $DR_2$, and $DR_4$ for use at the time of current limit for the angle axial force $AF_1$, the current axial force $AF_2$, and the lateral G-axial force $AF_4$. The distribution ratios $DR_1$, $DR_2$, and $DR_4$ for use at the time of the current limit are set to appropriate values depending on the product specifications or the like, from the standpoint of suppressing the influence of the current limit of the turning motor 41 on the steering reaction force command value T*, and, by extension, the steering reaction force. Further, the distribution ratios $DR_1$, $DR_2$, $DR_4$ for use at the time of current limit are used in preference to the distribution ratios $DR_1$, $DR_2$, $DR_4$ set by the axial force distribution calculator 81C.

When the value of the flag F is "1", the distribution ratio calculator 81E sets the values of the distribution ratios $DR_1$, $DR_2$, $DR_4$ for use at the time of current limit such that the reflection degree of the current axial force $AF_2$ in the final axial force $AF_3$ decreases, while the total reflection degree of the angle axial force $AF_1$ and the lateral G-axial force $AF_4$ in the final axial force $AF_3$ increases.

When the value of the flag F is "1", the distribution ratio calculator 81E may set, for example, the value of the distribution ratio $DR_2$ of the current axial force $AF_2$ to "0 (0%)", the value of the distribution ratio $DR_1$ of the angle axial force $AF_1$ to "0.5 (50%)", and the value of the distribution ratio $DR_4$ of the lateral G-axial force $AF_4$ to "0.5 (50%)". Further, when the value of the flag F is "1", the distribution ratio calculator 81E may set, for example, each of the value of the distribution ratio $DR_2$ of the current axial force $AF_2$ and the value of the distribution ratio $DR_1$ of the angle axial force $AF_1$ to "0", and meanwhile, the value of the distribution ratio $DR_4$ of the lateral G-axial force $AF_4$ to "1".

In this way, the reflection degree of the current axial force $AF_2$ in the final axial force $AF_3$ decreases, while the total reflection degree of the angle axial force $AF_1$ and the lateral G-axial force $AF_4$ in the final axial force $AF_3$ increases. Therefore, the influence of the current limit of the turning motor 41 on the steering reaction force command value T* and, by extension, the steering reaction force is suppressed.

Further, as in the fourth embodiment described above, the distribution ratio calculator 81E may not set the value of the distribution ratio $DR_2$ of the current axial force $AF_2$ to "0 (0%)" even when the value of the flag F is "1". When the value of the flag F is "1", the distribution ratio calculator 81E may set, for example, the value of the distribution ratio $DR_2$ of the current axial force $AF_2$ to "0.1 (10%)", the value of the distribution ratio $DR_1$ of the angle axial force $AF_1$ to "0.6 (60%)", and the value of the distribution ratio $DR_4$ of the lateral G-axial force $AF_4$ to "0.3 (30%)".

Even in this way, the reflection degree of the current axial force $AF_2$ in the final axial force $AF_3$ decreases, while the total reflection degree of the angle axial force $AF_1$ and the lateral G-axial force $AF_4$ in the final axial force $AF_3$ increases. Therefore, the influence of the current limit of the turning motor 41 on the steering reaction force command value T* and, by extension, the steering reaction force is suppressed.

Therefore, according to the sixth embodiment, the following effects can be obtained. When a specific situation occurs in which the current $I_b$ of the turning motor 41 has to be limited, the reflection degree of the current axial force $AF_2$ in the final axial force $AF_3$, which is calculated based on the current $I_b$ of the turning motor 41, decreases, while the total reflection degree of the angle axial force $AF_1$ and the lateral G-axial force $AF_4$, which are less affected by the change in the current $I_b$ of the turning motor 41, in the final axial force $AF_3$ increases. Therefore, it is possible to suppress the influence by the current limit of the turning motor 41 on the steering reaction force command value T* and, by extension, the steering reaction force. As a result, it is possible to secure the steering reaction force as information for the driver even when the current of the turning motor 41 is limited.

Furthermore, as shown by the reference numerals in parentheses in FIG. 5, a yaw rate axial force calculator 81H may be provided instead of the lateral G-axial force calculator 81G. The yaw rate axial force calculator 81H calculates a yaw rate axial force $AF_5$, which is the axial force acting on the turning shaft 14, based on a yaw rate YR detected through a yaw rate sensor 504 provided in the vehicle. The yaw rate axial force $AF_5$ is obtained by multiplying a yaw rate differential value, which is a value obtained by differentiating the yaw rate YR, by a vehicle speed gain, which is a coefficient according to the vehicle speed V. The vehicle speed gain is set to a larger value as the vehicle speed V becomes faster. Since the behavior of the vehicle is reflected in the yaw rate YR, the behavior of the vehicle is also reflected in the yaw rate axial force $AF_5$ calculated based on the yaw rate YR. Further, since the yaw rate axial force $AF_5$ is calculated based on the yaw rate YR, the yaw rate axial force $AF_5$ is not easily affected by the current limit of the turning motor 41. Therefore, even when the yaw rate axial force calculator 81H is provided instead of the lateral G-axial force calculator 81G, the same effect as when the lateral G-axial force calculator 81G is provided can be obtained.

Further, depending on the product specifications and the like, the configuration of the axial force calculator 72 may be employed in which the angle axial force calculator 81A is omitted. In the case where the above configuration is employed, when a specific situation occurs in which the current $I_b$ of the turning motor 41 has to be limited, the distribution ratio calculator 81E calculates the values of the distribution ratios $DR_2$, $DR_4$ for use at the time of current limit such that the reflection degree of the current axial force $AF_2$ in the final axial force $AF_3$ decreases, while the reflection degree of the lateral G-axial force $AF_4$ in the final axial force $AF_3$ increases. Therefore, it is possible to suppress the influence by the current limit of the turning motor 41 on the steering reaction force.

Seventh Embodiment

Next, a seventh embodiment in which a steering control device is embodied as a steer-by-wire type steering device will be described. The embodiment basically has the same configuration as that of the second embodiment described above. The embodiment is different from the first embodiment in the configuration of the axial force calculator 72.

Figure 6:
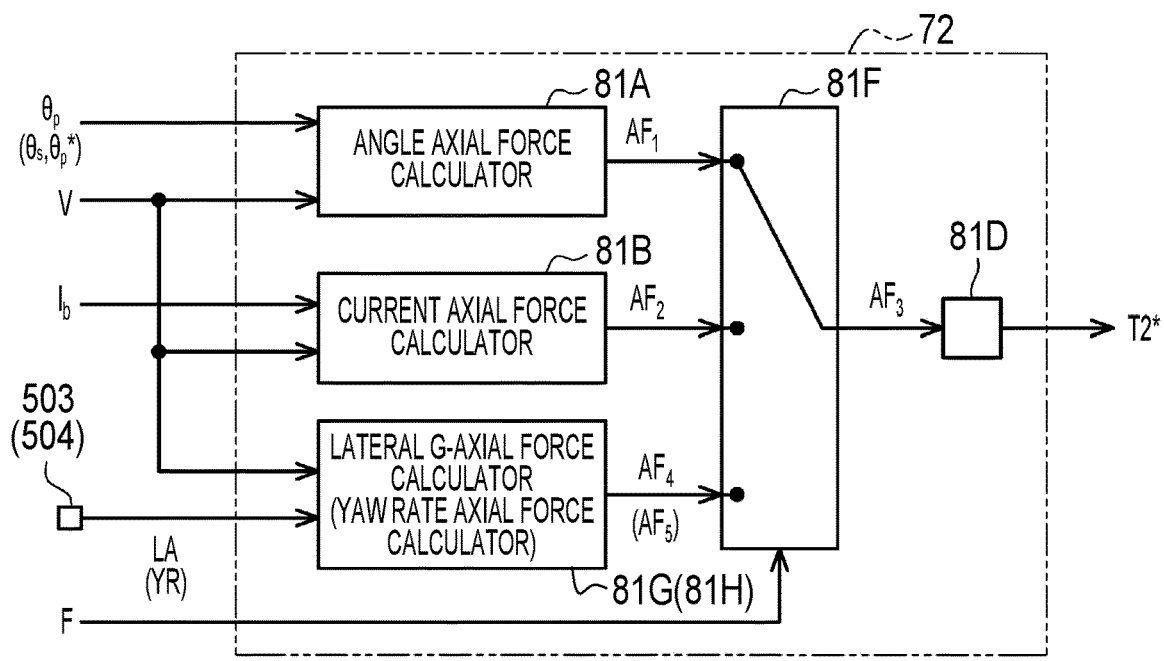
FIG. 6 is a block diagram of an axial force calculator according to a seventh embodiment.

As shown in FIG. 6, the axial force calculator 72 has the same configuration as that of the second embodiment, that is, the angle axial force calculator 81A, the current axial force calculator 81B, the converter 81D, and the switch 81F, and in addition, has the lateral G-axial force calculator 81G.

When the value of the flag F is "0", the switch 81F selects the current axial force $AF_2$ calculated by the current axial force calculator 81B as the final axial force $AF_3$. When the value of the flag F is "1", the switch 81F selects, as the final axial force $AF_3$, the angle axial force $AF_1$ calculated by the angle axial force calculator 81A, or the lateral G-axial force $AF_4$ calculated by the lateral G-axial force calculator 81G. Note that the axial force selected when the value of the flag F is "1" is decided by the product specifications.

Therefore, according to the seventh embodiment, the following effects can be obtained. When a specific situation occurs in which the current $I_b$ of the turning motor 41 has to be limited, the current axial force $AF_2$ calculated based on the current $I_b$ of the turning motor 41 is not used. That is, the angle axial force $AF_1$ or the lateral G-axial force $AF_4$, which is not affected by the current limit of the turning motor 41, is calculated as the final axial force $AF_3$, which is the final axial force reflected in the steering reaction force command value T*. Therefore, it is possible to secure the steering reaction force as information for the driver even when the current of the turning motor 41 is limited.

Further, when a specific situation occurs in which the current $I_b$ of the turning motor 41 has to be limited, the axial force reflected in the steering reaction force command value T* can be switched from the current axial force $AF_2$ to the angle axial force $AF_1$ or lateral G-axial force $AF_4$ simply by the operation of the switch 81F. Therefore, it is possible to reduce the calculation load of the control device 50.

Furthermore, depending on the product specifications and the like, the configuration of the axial force calculator 72 may be employed in which the angle axial force calculator 81A is omitted. In the case where the above configuration is employed, when a specific situation occurs in which the current $I_b$ of the turning motor 41 has to be limited, the lateral G-axial force $AF_4$ is calculated as the final axial force $AF_3$. The lateral G-axial force $AF_4$ is not easily affected by the current limit of the turning motor 41. Therefore, it is possible to secure the steering reaction force as information for the driver even when the current of the turning motor 41 is limited.

As shown by the reference numerals in parentheses in FIG. 6, the yaw rate axial force calculator 81H may be provided instead of the lateral G-axial force calculator 81G. In the case where the above configuration is employed, when a specific situation occurs in which the current $I_b$ of the turning motor 41 has to be limited, the angle axial force $AF_1$ or the yaw rate axial force $AF_5$ is calculated as the final axial force $AF_3$. The yaw rate axial force $AF_5$ is not easily affected by the current limit of the turning motor 41. Therefore, it is possible to secure the steering reaction force as information for the driver even when the current of the turning motor 41 is limited.

Eighth Embodiment

Next, an eighth embodiment in which a steering control device is embodied as a steer-by-wire type steering device will be described. The embodiment basically has the same configuration as the first embodiment shown in FIGS. 1 to 3 above. Further, in the embodiment, as in the third embodiment described above, a plurality of situations are assumed in which the current of the turning motor 41 has to be limited.

The reaction force controller 50a and the turning controller 50b of the control device 50 are provided as separate electronic control units (ECUs) independent of each other. The reaction force controller 50a and the turning controller 50b exchange information with each other through an in-vehicle network such as a controller area network (CAN).

The limit controller 64 detects the temperature $T_m$ of the turning motor 41 through the temperature sensor 62a. The limit controller 64 determines the heat generation state of the turning motor 41 by comparing the temperature $T_m$ of the turning motor 41 with a plurality of temperature threshold values. The heat generation state of the turning motor 41 includes a normal heat generation state that does not generate enough heat to limit the current of the turning motor 41, a mild overheating state, a moderate overheating state, and a severe overheating state. The limit controller 64 calculates a limit value $I_{lim}$ having a smaller absolute value as the degree of overheating of the turning motor 41 increases.

Further, the limit controller 64 detects the voltage $V_b$ of the DC power supply through the voltage sensor 50₂. The limit controller 64 determines the state of the voltage of the DC power supply by comparing the voltage $V_b$ of the DC power supply with a plurality of voltage threshold values. The voltage state of the DC power supply includes a normal voltage state in which the voltage is not lowered en enough to limit the current of the turning motor 41, a mild voltage-lowering state, a moderate voltage-lowering state, and a severe voltage-lowering state. The limit controller 64 calculates the limit value $I_{lim}$ having a smaller absolute value as the lowered degree of voltage of the DC power supply increases.

The limit controller 64 executes the following processing instead of setting the value of the flag F indicating whether or not a situation occurs in which the amount of current of the turning motor 41 has to be limited. That is, the limit controller 64 encodes the state of the steering device 10 according to a code table stored in the storage device of the control device 50. The encoding refer to a process of expressing the state of the steering device 10 with a code as a symbol. The state of the steering device 10 includes the heat generation state of the turning motor 41 and the voltage state of the DC power supply. An example of the correspondence between the state of the steering device 10 and the code is as follows.

Code "0": Normal state where the current of the turning motor 41 is not limited

Code "1A": Mild overheating state of the turning motor 41

Code "1B": Moderate overheating state of the turning motor 41

Code "1C": Severe overheating state of the turning motor 41

Code "2A": Mild voltage-lowering state of the DC power supply

Code "2B": Moderate voltage-lowering state of the DC power supply

Code "2C": Severe voltage-lowering state of the DC power supply

The turning controller 50b transmits a code set by the limit controller 64 to the reaction force controller 50a through the in-vehicle network. The reaction force controller 50a receives the code through the in-vehicle network, and executes reaction force control according to the received code. For example, the reaction force controller 50a changes the value of the distribution ratio $DR_1$ of the angle axial force $AF_1$ and the value of the distribution ratio $DR_2$ of the current axial force $AF_2$ according to the code, as part of the reaction force control. For example, the distribution ratio calculator 81E changes, step by step, the values of the two distribution ratios $DR_1$, $DR_2$ with the degree of the situation grasped from the code in which the current of the turning motor 41 has to be limited.

When the turning motor 41 is in the overheating state, as the overheating state worsens in the order of "mild", "moderate", and "severe", the distribution ratio calculator 81E sets the value of the distribution ratio $DR_1$ of the angle axial force AF1 to a larger value, and meanwhile, sets the value of the distribution ratio $DR_2$ of the current axial force $AF_2$ to a smaller value. Note that the two distribution ratios $DR_1$, $DR_2$ for use at the time of current limit are set such that the sum of the two distribution ratios is "1 (100%)". Further, the two distribution ratios $DR_1$, $DR_2$ for use at the time of current limit are set to appropriate values depending on the product specifications and the like. Specific setting examples of the two distribution ratios $DR_1$, $DR_2$ are as follows.

When the code "1A" is acquired, that is, when the heat generation state of the turning motor 41 is the mild overheating state, the distribution ratio calculator 81E sets the values of the two distribution ratios $DR_1$, $DR_2$, as expressed by the following relational expression (8).

$$DR_1:DR_2=0.8(80\%):0.2(20\%) \quad (8)$$

When the code "1B" is acquired, that is, when the heat generation state of the turning motor 41 is the moderate overheating state, the distribution ratio calculator 81E sets the values of the two distribution ratios $DR_1$, $DR_2$, as expressed by the following relational expression (9).

$$DR_1:DR_2=0.9(90\%):0.1(10\%) \quad (9)$$

When the code "1C" is acquired, that is, when the heat generation state of the turning motor 41 is the severe overheating state, the distribution ratio calculator 81E sets the values of the two distribution ratios $DR_1$, $DR_2$, as expressed by the following relational expression (10).

$$DR_1:DR_2=1(100\%):0(0\%) \quad (10)$$

When the voltage $V_b$ of the DC power supply is lowed, as the degree of lowering worsens in the order of "mild", "moderate", and "severe", the distribution ratio calculator 81E sets the value of the distribution ratio $DR_1$ of the angle axial force AF1 to a larger value, and meanwhile, sets the value of the distribution ratio $DR_2$ of the current axial force $AF_2$ to a smaller value. Note that the two distribution ratios $DR_1$, $DR_2$ for use at the time of current limit are set such that the sum of the two distribution ratios is "1 (100%)". Further, the two distribution ratios $DR_1$, $DR_2$ for use at the time of current limit are set to appropriate values depending on the product specifications and the like. Specific setting examples of the two distribution ratios $DR_1$, $DR_2$ are as follows.

When the code "2A" is acquired, that is, when the state of the DC power supply is the mild voltage-lowering state, the distribution ratio calculator 81E sets the values of the two distribution ratios $DR_1$, $DR_2$, as expressed by the following relational expression (11).

$$DR_1:DR_2=0.8(80\%):0.2(20\%) \quad (11)$$

When the code "2B" is acquired, that is, when the state of the DC power supply is the moderate voltage-lowering state, the distribution ratio calculator 81E sets the values of the two distribution ratios $DR_1$, $DR_2$, as expressed by the following relational expression (12).

$$DR_1:DR_2=0.9(90\%):0.1(10\%) \quad (12)$$

When the code "2C" is acquired, that is, when the state of the DC power supply is the severe voltage-lowering state, the distribution ratio calculator 81E sets the values of the two distribution ratios $DR_1$, $DR_2$, as expressed by the following relational expression (13).

$$DR_1:DR_2=1(100\%):0(0\%) \quad (13)$$

Furthermore, it is conceivable that a plurality of situations in which the current of the turning motor 41 has to be limited (here, the overheating of the turning motor 41 and the voltage-lowering of the DC power supply) occur at the same time. From the standpoint corresponding to such a situation, priority may be given to the codes according to, for example, the type of state or the degree of state of the steering device 10. For example, the code "1C" indicating the severe overheating state of the turning motor 41 is prioritized over the code "2A" indicating the mild voltage-lowering state of the DC power supply.

Therefore, according to the eighth embodiment, the following effects can be obtained. The turning controller 50b transmits, to the reaction force controller 50a, the code that is a symbol indicating the state of the steering device 10. Therefore, as compared to the case where information such as the temperature $T_m$ of the turning motor 41 and the voltage $V_b$ of the DC power supply acquired by the turning controller 50b is transmitted as it is to the reaction force controller 50a as information indicating the state of the steering device 10, the communication load between the reaction force controller 50a and the turning controller 50b is decreased.

According to the degree of the specific situation in which the current $I_b$ of the turning motor 41 has to be limited, for example, the degree of overheating of the turning motor 41 or the degree of the voltage-lowering of the DC power supply, the value of the distribution ratio $DR_1$ of the angle axial force $AF_1$ and the value of the distribution ratio $DR_2$ of the current axial force $AF_2$ are increased or decreased. This makes it possible to switch, step by step, between the angle axial force $AF_1$ and the current axial force $AF_2$ with the degree of the specific situation in which the current $I_b$ of the turning motor 41 has to be limited. Therefore, it is possible to secure, step by step, the steering reaction force as information for the driver with the degree of the specific situation in which the current $I_b$ of the turning motor 41 has to be limited.

OTHER EMBODIMENTS

The first to eighth embodiments may be modified as follows. In the first to eighth embodiments, instead of the pinion angle $\theta_p$, the angle axial force calculator 81A may calculate the angle axial force $AF_1$ based on the steering angle $\theta_s$ calculated by the steering angle calculator 51 or the target pinion angle $\theta_p{}^*$ calculated by the target pinion angle calculator 62. The angle axial force $AF_1$ calculated in this way is also an ideal value of the axial force acting on the turning shaft 14 according to the steering condition.

In the first to seventh embodiments, the reaction force controller 50a and the turning controller 50b in the control device 50 may be separate electronic control units (ECUs) independent of each other. In the first to eighth embodiments, the steering device 10 may be provided with a clutch. In this case, as shown by the two-dot chain line in FIG. 1, the steering shaft 12 and the pinion shaft 13 are connected through the clutch 21. As the clutch 21, an electromagnetic clutch is employed that intermittently supplies power through intermittent energization of an exciting coil. The control device 50 executes intermittent control for switching the engagement and disengagement of the clutch 21. When the clutch 21 is disengaged, the power transmission between the steering wheel 11 and the turning wheel 16 is mechanically disconnected. When the clutch 21 is engaged, the power transmission between the steering wheel 11 and the turning wheel 16 is mechanically connected.

What is claimed is:

1. A steering control device comprising:
    a reaction force controller that is configured to control a reaction force motor based on a command value calculated according to a steering condition, the reaction force motor being a source of a steering reaction force applied to a steering wheel that is separated in power transmission from a turning shaft; and
    a turning controller, separate from the reaction force controller, that is configured to control a turning motor that is a source of a turning force applied to the turning shaft according to a steering condition, wherein
    the reaction force controller includes:
        a first calculator configured to calculate a first axial force acting on the turning shaft based on a current value of the turning motor;
        a second calculator configured to calculate a second axial force acting on the turning shaft based on a vehicle state variable different from the current value of the turning motor; and
        a third calculator configured to calculate a third axial force that is a final axial force to be reflected in the command value based on the first axial force and the second axial force,
    the turning controller is configured to, when a specific situation occurs in which a current of the turning motor has to be limited, set a code, from a plurality of predefined codes stored in a storage device, in accordance with a degree of the specific situation and transmit the code to the reaction force controller through an in-vehicle network, and
    the reaction force controller is configured to, when the specific situation occurs, decrease a reflection degree of the first axial force in the third axial force and increase a reflection degree of the second axial force in the third axial force according to the code from the turning controller.

2. The steering control device according to claim 1, wherein
    the third calculator is configured to calculate the third axial force by adding up values obtained by multiplying the first axial force and the second axial force by distribution ratios, the distribution ratios being set individually according to a vehicle behavior, a steering condition, or a road surface condition, and
    the third calculator is configured to, when the specific situation occurs in which the current of the turning motor has to be limited, decrease the distribution ratio of the first axial force to the third axial force and increase the distribution ratio of the second axial force to the third axial force according to the code.

3. The steering control device according to claim 2, further comprising a fourth calculator configured to, when the specific situation occurs in which the current of the turning motor has to be limited, individually calculate, according to the code, the distribution ratios for use at a time of current limit for the first axial force and the second axial force, based on a predetermined standpoint, the predetermined standpoint being a standpoint where the distribution ratio of the first axial force to the third axial force is further decreased, while the distribution ratio of the second axial force to the third axial force is further increased, wherein
    the third calculator is configured to, when the specific situation occurs in which the current of the turning motor has to be limited, calculate the third axial force by using the distribution ratios for use at the time of current limit which are calculated by the fourth calculator.

4. The steering control device according to claim 3, wherein
    the degree of the specific situation in which the current of the turning motor has to be limited includes mild, moderate, and severe, and
    the fourth calculator is configured to, when the code indicates that the degree of the specific situation is severe, set the distribution ratio of the first axial force to the third axial force to 0% and set the distribution ratio of the second axial force to the third axial force to 100%.

5. The steering control device according to claim 4, wherein the fourth calculator is configured to progressively adjust the distribution ratios for use at the time of current limit as the degree of the specific situation changes from mild to moderate to severe, such that the reflection degree of the first axial force in the third axial force is progressively decreased and the reflection degree of the second axial force in the third axial force is progressively increased as the degree of the specific situation worsens from mild to moderate to severe.

* * * * *